United States Patent
Nakanishi et al.

(10) Patent No.: US 12,486,395 B2
(45) Date of Patent: Dec. 2, 2025

(54) RESIN COMPOSITION

(71) Applicant: Mitsubishi Chemical Corporation, Tokyo (JP)

(72) Inventors: Shinji Nakanishi, Tokyo (JP); Eri Ikubo, Tokyo (JP); Nobuyuki Yamamoto, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 484 days.

(21) Appl. No.: 18/107,389

(22) Filed: Feb. 8, 2023

(65) Prior Publication Data

US 2023/0183468 A1 Jun. 15, 2023

Related U.S. Application Data

(63) Continuation of application No. PCT/JP2021/031390, filed on Aug. 26, 2021.

(30) Foreign Application Priority Data

Aug. 31, 2020 (JP) .................. 2020-146112

(51) Int. Cl.
*C08L 29/04* (2006.01)
*C08L 23/06* (2006.01)

(52) U.S. Cl.
CPC ............... *C08L 29/04* (2013.01); *C08L 23/06* (2013.01); *C08L 2205/025* (2013.01); *C08L 2205/03* (2013.01); *C08L 2207/062* (2013.01); *C08L 2207/066* (2013.01)

(58) Field of Classification Search
CPC .... C08L 2207/066; C08L 23/06; C08L 29/04; C08L 23/0815; C08L 23/0853; C08L 23/0861; C08L 23/26
See application file for complete search history.

(56) References Cited

U.S. PATENT DOCUMENTS

| | | | |
|---|---|---|---|
| 5,747,633 A | 5/1998 | Ito et al. | |
| 6,398,059 B1 * | 6/2002 | Hayashi | C08L 77/02 220/62.22 |
| 2010/0266858 A1 | 10/2010 | Chopinez et al. | |
| 2013/0059977 A1 | 3/2013 | Kurokawa et al. | |
| 2014/0079935 A1 * | 3/2014 | Broyles | C08L 23/0869 524/53 |
| 2014/0272370 A1 | 9/2014 | Broyles et al. | |
| 2015/0298438 A1 | 10/2015 | Nevalainen et al. | |
| 2017/0056253 A1 * | 3/2017 | Chester | A61F 13/51478 |
| 2017/0087812 A1 * | 3/2017 | Hirose | C08L 23/0861 |
| 2017/0183426 A1 | 6/2017 | Kawai et al. | |
| 2022/0135778 A1 * | 5/2022 | Nakanishi | C08L 101/08 525/240 |
| 2023/0043006 A1 | 2/2023 | Sawano et al. | |

FOREIGN PATENT DOCUMENTS

| | | |
|---|---|---|
| CN | 101679731 A | 3/2010 |
| CN | 102977449 A | 3/2013 |
| CN | 104884254 A | 9/2015 |
| CN | 114127167 A | 3/2022 |
| CN | 115348991 A | 11/2022 |
| EP | 3121230 A1 | 1/2017 |
| JP | 2001-200124 A | 7/2001 |
| JP | 2003-160706 A | 6/2003 |
| JP | 2003-192016 A | 7/2003 |
| JP | 2013-151623 A | 8/2013 |
| JP | 2014-104729 A | 6/2014 |
| JP | 2014-213903 A | 11/2014 |
| JP | 2016-5875 A | 1/2016 |
| JP | 2016-29159 A | 3/2016 |
| JP | 2014-200968 A | 3/2018 |
| JP | WO2019/131168 A1 | 7/2019 |
| JP | 2020-49837 A | 4/2020 |
| JP | 2021-045963 A | 3/2021 |
| WO | 2017/110890 A1 | 6/2017 |
| WO | 2021/029355 A1 | 2/2021 |

OTHER PUBLICATIONS

International Preliminary Report on Patentability and Written Opinion issued in related International Patent Application No. PCT/JP2021/031390 dated Mar. 9, 2023.
Notification of Reasons for Refusal issued Jan. 27, 2024 for Chinese Patent Application No. 202180055399.1.
Extended European Search Report issued Jan. 30, 2024 for European Patent Application No. 21861681.1.
International Search Report issued in related International Patent Application No. PCT/JP2021/031390 dated Oct. 19, 2021.

\* cited by examiner

*Primary Examiner* — Mark S Kaucher
(74) *Attorney, Agent, or Firm* — Morgan, Lewis & Bockius LLP

(57) ABSTRACT

The present disclosure provides a resin composition includes a low-density bio-polyethylene resin (A), an ethylene-vinyl alcohol copolymer (B) in which the ethylene content is 20 to 60 mol %, and at least one component (C) selected from the group consisting of an ethylene-vinyl acetate copolymer, an acid-modified polymer, and an ethylene-vinyl alcohol copolymer in which the ethylene content is 70 to 90 mol %, the low-density bio-polyethylene resin (A) being a low-density bio-polyethylene resin other than a linear low-density bio-polyethylene resin, the weight ratio [(A)/(B)] of the component (A) to the component (B) being 10/90 to 49/51.

2 Claims, No Drawings

RESIN COMPOSITION

RELATED APPLICATIONS

This application is a continuation of International Application No. PCT/JP2021/031390, filed on Aug. 26, 2021, which claims priority to Japanese Patent Application No. 2020-146112, filed on Aug. 31, 2020, the entire contents of each being herein incorporated by reference.

TECHNICAL FIELD

The present disclosure relates to a resin composition, and more particularly to a resin composition that suppresses the generation of die drool and is formed into a molded product having an excellent external appearance even when a bio-polyethylene resin is contained in the resin composition.

BACKGROUND ART

Conventionally, ethylene-vinyl alcohol copolymers are mainly used in food packaging members because of excellent gas barrier properties and transparency. Although sheets, films, and the like used as the food packaging members can be produced using only the ethylene-vinyl alcohol copolymers, such food packaging members are generally used in multilayer structures formed by stacking a layer made of a polyolefin resin or the like on an ethylene-vinyl alcohol copolymer layer with an adhesive agent layer interposed between the layer made of a polyolefin resin or the like and the ethylene-vinyl alcohol copolymer layer through melt-molding so as to impart water resistance, strength, and other functions.

On the other hand, in recent years, it has been considered that a portion of petroleum-derived resins used in the multilayer structures is replaced with resins derived from biomass resources such as plants in order to reduce the environmental burden (see PTL 1 to 3, for example).

RELATED ART DOCUMENTS

Patent Documents

PTL 1: JP-A-2014-200968
PTL 2: JP-A-2014-104729
PTL 3: JP-A-2014-213903

SUMMARY

The biomass-resource-derived polyethylene resins contain a large amount of low-molecular-weight components compared with petroleum-derived polyethylene resins. Therefore, in the case where a resin composition containing an ethylene-vinyl alcohol copolymer and a biomass-resource-derived polyethylene resin is produced through melt-molding, the biomass-resource-derived polyethylene resin may be excluded from the resin composition and form die drool at a discharge port of a kneader or the like. Depending on the type and amount of a biomass-resource-derived polyethylene resin used in a resin composition, the color of the resin composition changes and the amount of die drool derived from the polyethylene resin is increased, which results in a poor external appearance. Therefore, there has been a demand for a further improvement.

In general, in the case of manufacturing pellets of a resin composition, the resin composition is melt-kneaded and is then extruded in a strand shape and cut into pellets. However, if the extruded resin composition has a significantly rough surface, the resin composition is difficult to cut and is likely to be formed into pellets having an unfavorable shape. The pellets having an unfavorable shape cause poor bite during processing and molding, and gel generation during film formation caused by an increase in the amount of fine powder, and, therefore, the pellet shape is important. However, in the case of manufacturing pellets of a resin composition containing a biomass-resource-derived polyethylene resin, the extruded resin composition has a significantly rough surface and is likely to be formed into pellets having an unfavorable shape. Therefore, there has been a demand for further improvement.

In view of the circumstances above, the inventors of the present disclosure conducted in-depth research. As a result, the inventors found that the aforementioned problems are solved by blending a specific component into a base polymer that contains, at a specific ratio, a low-density, bio-polyethylene resin and an ethylene-vinyl alcohol copolymer containing ethylene in an amount of 20 to 60 mol %.

That is to say, the present disclosure provides [1] and [2] below.

[1] A resin composition including a low-density, bio-polyethylene resin (A); an ethylene-vinyl alcohol copolymer (B) in which an ethylene content is 20 to 60 mol %; and at least one component (C) selected from the group consisting of an ethylene-vinyl acetate copolymer, an acid-modified polymer, and an ethylene-vinyl alcohol copolymer in which an ethylene content is 70 to 90 mol %, wherein the low-density bio-polyethylene resin (A) is a low-density bio-polyethylene resin other than a linear low-density bio-polyethylene resin, and a weight ratio [(A)/(B)] of the component (A) to the component (B) is 10/90 to 49/51.

[2] The resin composition according to [1], wherein a content of the component (C) is 0.1 to 20 parts by weight with respect to a total of 100 parts by weight of the component (A) and the component (B).

The resin composition according to the present disclosure can make it less likely that pellets having an unfavorable shape are formed. Also, the generation of die drool during molding can be suppressed, and the impairment of the external appearance of a molded product, such as a change in color, can be suppressed.

DESCRIPTION OF EMBODIMENT

Hereinafter, embodiments of the present disclosure will be described in detail. However, the present disclosure is not limited to these embodiments.

In the present disclosure, an "ethylene-vinyl alcohol copolymer in which the ethylene content is 20 to 60 mol %" may be referred to as an "EVOH."

Note that, in the present disclosure, the wording "x and/or y (x and y are any configurations or components)" encompasses three combinations: only x, only y, and x and y.

The resin composition according to the present disclosure is produced by blending a specific component (C) into a base polymer that contains a low-density, bio-polyethylene resin (A) and an EVOH (B) at a specific ratio. The individual components will be described below.

Low-Density, Bio-Polyethylene Resin (A)

A low-density bio-polyethylene resin (A) used in the present disclosure is selected from the group consisting of low-density bio-polyethylene resins (LDPE; density: lower than 0.925 g/cm$^3$) excluding linear low-density bio-polyethylene resins (LLDPE; density: 0.910 to 0.925 g/cm$^3$).

The "bio-polyethylene resin" above means a polyethylene resin that is chemically or biologically synthesized from a renewable biomass resource serving as a starting material. The bio-polyethylene resin is characterized in that, due to the carbon-neutral nature of the biomass, the bio-polyethylene resin does not increase the concentration of carbon dioxide in the atmosphere even when it is disposed of by incineration.

Preferably, plant-derived ethylene that is derived from bioethanol obtained from a plant material is used for the bio-polyethylene resin. That is to say, the bio-polyethylene resin is preferably a plant-derived polyethylene resin.

There is no difference in the molecular weight and physical properties, such as mechanical properties and thermal properties, between plant-derived (biomass-resource-derived) polyethylene resins and petroleum-derived polyethylene resins. Therefore, to distinguish between them, the biomass rate is commonly used. The "biomass rate" is an indicator of the content ratio of a plant-derived, bio-polyethylene resin and is obtained by measuring the concentration of $^{14}C$ (radioactive carbon-14 with a half-life of 5,730 years) by accelerator mass spectrometry, since carbon constituting a petroleum-derived polyethylene resin does not contain $^{14}C$. Accordingly, any film in which a plant-derived polyethylene resin is used has a biomass rate corresponding to the content of the plant-derived polyethylene resin when the biomass rate of the film is measured. That is to say, bio-polyethylene resins are characterized in that the bio-polyethylene resins include radioactive carbon ($^{14}C$).

The biomass rate can be measured, for example, by using the following method. A sample to be measured is burned to generate carbon dioxide, which is then purified in a vacuum line and reduced with hydrogen using iron as a catalyst to generate graphite. The graphite is then loaded in a dedicated $^{14}C$-AMS machine (manufactured by NEC) based on a tandem accelerator, and the $^{14}C$ count, the concentration of $^{13}C$ ($^{13}C/^{12}C$), and the concentration of $^{14}C$ ($^{14}C/^{12}C$) are measured. Then, the ratio of the $^{14}C$ concentration of the sample carbon to standard modern carbon is calculated from these measured values.

Examples of the low-density bio-polyethylene resin (A) include low-density bio-polyethylene homopolymers obtained through polymerization of ethylene derived from bioethanol, and low-density bio-polyethylene copolymers. The low-density bio-polyethylene copolymers are copolymers composed of ethylene and a small amount of comonomer, and examples of the low-density bio-polyethylene copolymers include copolymers composed of ethylene and another α-olefin monomer with a weight fraction of less than 50% or a non-olefin monomer having a functional group with a weight fraction of 3% or less.

Examples of the other α-olefin include α-olefins with 3 to 20 carbon atoms, such as propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 4-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. These α-olefin monomers may be used alone or in combination of two or more.

Examples of the non-olefin monomers include styrene monomers, diene monomers, cyclic monomers, and oxygen atom-containing monomers. These non-olefin monomers may be used alone or in combination of two or more.

Examples of the styrene monomers include styrene, 4-methylstyrene, and 4-dimethylaminostyrene.

Examples of the diene monomers include 1,3-butadiene, 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, and dicyclooctadiene.

Examples of the cyclic monomers include methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,2-norbornadiene, and cyclopentene.

Examples of the oxygen atom-containing monomer include hexenol, hexenoic acid, and methyl octenoate.

These other α-olefin monomers and non-olefin monomers may be made from renewable biomass resources or petroleum. In the cases where α-olefin or non-olefin monomers made from renewable biomass resources are used, the biomass rate of final products can be increased even more. In the cases where α-olefin or non-olefin monomers made from petroleum are used, since a wide variety of monomers are available, using these monomers to manufacture the low-density, bio-polyethylene resin (A) makes it easy to adjust the physical properties and the like of the low-density bio-polyethylene resin (A).

The low-density bio-polyethylene resin (A) used in the present disclosure is obtained by performing homopolymerization of ethylene or copolymerization of ethylene and a comonomer according to, for example, an ordinary method using a metallocene catalyst or a Ziegler-Natta catalyst. Specifically, a metallocene catalyst is preferably used.

The melt flow rate (MFR) (at 190° C. and a load of 2,160 g) of the low-density bio-polyethylene resin (A) is typically 0.1 to 50 g/10 minutes, preferably 0.5 to 30 g/10 minutes, and more preferably 2 to 10 g/10 minutes.

If the MFR is too high, the film-forming properties tend to be unstable, and, if the MFR is too low, the viscosity tends to be too high and melt extrusion tends to be difficult.

Examples of commercially available products that can be suitably used as the low-density bio-polyethylene resin (A) of the present disclosure include SEB853 (manufactured by Braskem) and the like.

These low-density bio-ethylene resins (A) may be used alone or in combination of two or more.

EVOH (B)

The EVOH (B) is typically a resin obtained through saponification of an ethylene-vinyl ester copolymer, which is a copolymer of ethylene and a vinyl ester monomer, and is a water-insoluble thermoplastic resin. As the vinyl ester monomer, vinyl acetate is typically used from an economic standpoint.

Polymerization of ethylene and a vinyl ester monomer can be performed using any known polymerization method, such as solution polymerization, suspension polymerization, or emulsion polymerization, and solution polymerization using methanol as a solvent is typically used. Saponification of the obtained ethylene-vinyl ester copolymer can also be performed using a known method.

The EVOH (B) produced in this manner mainly contains ethylene-derived structural units and vinyl alcohol structural units, and usually contains a small amount of vinyl ester structural units that remain unsaponified.

As the vinyl ester monomer, vinyl acetate is typically used because of good market availability and efficiency in treating impurities during production. Examples of the vinyl ester monomers other than vinyl acetate include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate, and it is possible to use aliphatic vinyl esters typically with 3 to 20 carbon atoms, preferably with 4 to 10 carbon atoms, and more preferably with 4 to 7 carbon atoms. These vinyl ester monomers may be used alone or in combination of two or more.

The ethylene content in the EVOH (B) can be controlled by adjusting the pressure of ethylene in the copolymerization of the vinyl ester monomer and ethylene and is 20 to 60 mol %. The ethylene content is preferably 25 to 50 mol %, and more preferably 25 to 35 mol %. If the ethylene content is too low, the gas barrier properties and melt moldability under high humidity tend to be impaired, and, conversely, if the ethylene content is too high, the gas barrier properties tend to be impaired.

Note that the ethylene content can be measured as defined in ISO 14663.

Furthermore, the degree of saponification of the vinyl ester component in the EVOH (B) can be controlled by adjusting the amount of a saponification catalyst (typically, an alkaline catalyst such as sodium hydroxide is used), temperature, time, and the like when saponifying the ethylene-vinyl ester copolymer, and is typically 90 to 100 mol %, preferably 95 to 100 mol %, and more preferably 99 to 100 mol %. If the degree of saponification is too low, the gas barrier properties, thermal stability, moisture resistance, and the like tend to be impaired.

The degree of saponification of the EVOH (B) can be measured as defined in JIS K6726 (note: EVOH is used as a solution in which it is dissolved uniformly in water/methanol solvent).

The MFR (at 210° C. and a load of 2,160 g) of the EVOH (B) is typically 0.5 to 100 g/10 minutes, preferably 1 to 50 g/10 minutes, and more preferably 3 to 35 g/10 minutes. If the MFR is too high, the film-forming properties tend to be unstable, and, if the MFR is too low, the viscosity tends to be too high and melt extrusion tends to be difficult.

The MFR is an indicator of the degree of polymerization of the EVOH and can be adjusted by adjusting the amount of polymerization initiator and the amount of solvent when copolymerizing ethylene and the vinyl ester monomer.

Furthermore, the EVOH (B) may further contain structural units derived from a comonomer described below, as long as the effects of the present disclosure are not inhibited (e.g., in an amount of 10 mol % or less of the EVOH).

Examples of this comonomer include the following comonomers: olefins such as propylene, 1-butene, and isobutene; hydroxy group-containing α-olefins such as 3-buten-1-ol, 3-butene-1,2-diol, 4-penten-1-ol, and 5-hexene-1,2-diol, and derivatives of these olefins such as esterified products and acylated products; hydroxyalkyl vinylidenes such as 2-methylenepropane-1,3-diol and 3-methylenepentane-1,5-diol, hydroxyalkyl vinylidene diacetates such as 1,3-diacetoxy-2-methylenepropane, 1,3-dipropionyloxy-2-methylenepropane, and 1,3-dibutyryloxy-2-methylenepropane, unsaturated acids such as acrylic acid, methacrylic acid, crotonic acid, phthalic acid (phthalic anhydride), maleic acid (maleic anhydride), and itaconic acid (itaconic anhydride), and their salts and mono- and di-alkylesters having an alkyl group with 1 to 18 carbon atoms; acrylamides such as acrylamide, N-alkylacrylamide having an alkyl group with 1 to 18 carbon atoms, N,N-dimethylacrylamide, 2-acrylamidepropanesulfonic acid and salts of 2-acrylamidepropanesulfonic acid, and acrylamidepropyldimethylamine and acid salts and quaternary salts of acrylamidepropyldimethylamine; methacrylamides such as methacrylamide, N-alkylmethacrylamide having an alkyl group with 1 to 18 carbon atoms, N,N-dimethylmethacrylamide, 2-methacrylamidepropanesulfonic acid and salts of 2-methacrylamidepropanesulfonic acid, and methacrylamidepropyldimethylamine and acid salts and quaternary salts of methacrylamidepropyldimethylamine; N-vinylamides such as N-vinylpyrrolidone, N-vinylformamide, and N-vinylacetamide; vinyl cyanides such as acrylnitrile and methacrylnitrile; vinyl ethers such as alkyl vinyl ether having an alkyl group with 1 to 18 carbon atoms, hydroxyalkyl vinyl ether, and alkoxyalkyl vinyl ether; vinyl halide compounds such as vinyl chloride, vinylidene chloride, vinyl fluoride, vinylidene fluoride, and vinyl bromide; vinylsilanes such as trimethoxy vinylsilane; allyl halide compounds such as allyl acetate and allyl chloride; allyl alcohols such as allyl alcohol and dimethoxyallyl alcohol; and trimethyl-(3-acrylamide-3-dimethylpropyl)-ammonium chloride, acrylamide-2-methylpropanesulfonic acid, and the like. These comonomers may be used alone or in combination of two or more.

In particular, an EVOH obtained through copolymerization of hydroxy group-containing α-olefins, namely an EVOH having a primary hydroxy group in a side chain, is preferable in that good secondary moldability is achieved while the gas barrier properties are maintained. Specifically, an EVOH having a 1,2-diol structure in a side chain is more preferable.

In particular, when an EVOH having a primary hydroxy group in a side chain is used, the content of structural units derived from a monomer having the primary hydroxy group is typically 0.1 to 20 mol %, preferably 0.5 to 15 mol %, and more preferably 1 to 10 mol % of the EVOH.

Furthermore, the EVOH (B) used in the present disclosure may be "post-modified" by urethanation, acetalization, cyanoethylation, oxyalkylenation, or the like.

Moreover, the EVOH (B) used in the present disclosure may be a mixture of two or more EVOHs (B), such as those with, for example, different degrees of saponification, different degrees of polymerization, or different copolymerization components.

In the resin composition according to the present disclosure, the weight ratio [(A)/(B)] of the low-density bio-polyethylene resin (A) to the EVOH (B) is 10/90 to 49/51, preferably 20/80 to 45/55, and more preferably 30/70 to 40/60, from the viewpoint of making it less likely that pellets having an unfavorable shape are formed. If the blending ratio of the low-density bio-polyethylene resin (A) is too low, the moldability at low temperatures will be impaired. On the other hand, if the low-density bio-polyethylene resin (A) content is too high, obtained pellets will have an unfavorable shape.

The base polymer of the resin composition according to the present disclosure is composed of the low-density bio-polyethylene resin (A) and the EVOH (B), and the content of the base polymer in the resin composition is typically 60 wt. % or more, preferably 70 wt. % or more, and more preferably 80 wt. % or more. The upper limit of the content of the base polymer is typically 99.9 wt. %.

Component (C)

In the present disclosure, it is possible to make it less likely that pellets having an unfavorable shape are formed, to suppress the generation of die drool during molding and the impairment of the external appearance of a molded product, such as a change in color, by blending, into the base polymer, the component (C), which is at least one selected from the group consisting of ethylene-vinyl acetate copolymers, acid-modified polymers, and ethylene-vinyl alcohol copolymers in which the ethylene content is 70 to 90 mol %.

The content of the component (C) is preferably 0.1 to 20 parts by weight, more preferably 0.2 to 15 parts by weight, and even more preferably 0.5 to 10 parts by weight, with respect to a total of 100 parts by weight of the low-density bio-polyethylene resin (A) and the EVOH (B). When the content of the component (C) is within the range above, there is a trend that pellets having an unfavorable shape are less likely to be formed, and the generation of die drool during molding and the impairment of the external appearance of a molded product, such as a change in color, can be suppressed. In the case where the resin composition contains two or more types of components (C), the sum of all the contents is taken as the component (C) content. The individual components (C) will be described below.

Ethylene-Vinyl Acetate Copolymer

The ethylene-vinyl acetate copolymer (which may be referred to as an "EVA" hereinafter) is a polymer obtained through copolymerization of ethylene and vinyl acetate. The EVA may be modified as necessary.

The content of vinyl acetate in the EVA is typically 1 to 60 mol %, preferably 2 to 50 mol %, and more preferably 3 to 30 mol %. If the vinyl acetate content is too low, suppression of the generation of die drool and improvement in the external appearance of a molded product tend to become insufficient, and, conversely, if the vinyl acetate content is too high, the machine may be damaged by acetic acid generated during the decomposition of the EVA, which is decomposed at a low temperature. Also, the thermal stability of the resin composition itself tends to be impaired.

The MFR (at 190° C. and a load of 2,160 g) of the EVA is typically 0.1 to 100 g/10 minutes, preferably 0.5 to 50 g/10 minutes, and more preferably 1 to 30 g/10 minutes. If the MFR is out of the range above, the compatibility with the base polymer tends to be impaired, and the dispersibility during mixing tends to be impaired.

The EVA may be a carboxy group-containing modified EVA obtained by chemically bonding an unsaturated carboxylic acid or an anhydride of an unsaturated carboxylic acid to an EVA through an addition reaction, a grafting reaction, or the like to the extent that the gist of the present disclosure is not impaired Specifically, it is preferable that the modification level is, for example, 10 mol % or less. Examples of the unsaturated carboxylic acid and the anhydride of an unsaturated carboxylic acid include ethylenic unsaturated monocarboxylic acids such as acrylic acid, methacrylic acid, ethacrylic acid, and crotonic acid; ethylenic unsaturated dicarboxylic acids, anhydrides of ethylenic unsaturated dicarboxylic acids, and half esters of ethylenic unsaturated dicarboxylic acids, such as fumaric acid, itaconic acid, citraconic acid, maleic acid, monomethyl maleate, and monoethyl maleate. Specifically, maleic anhydride is preferable.

The content of the EVA is preferably 0.1 to 20 parts by weight, more preferably 0.2 to 15 parts by weight, and even more preferably 0.5 to 10 parts by weight, with respect to a total of 100 parts by weight of the low-density bio-polyethylene resin (A) and the EVOH (B). When the content of the EVA is within the range above, there is a trend that pellets having an unfavorable shape are much less likely to be formed, and the generation of die drool during molding and the impairment of the external appearance of a molded product, such as a change in color, can be suppressed. These EVAs may be used alone, or two or more of these EVAs that differ in the ethylene content, molecular weight, MFR, density, modifying group, level of modification by a modifying group, or the like may be used in combination.

Acid-Modified Polymer

The "acid-modified polymer" is a carboxy group-containing modified polymer obtained by chemically bonding an unsaturated carboxylic acid or an anhydride of an unsaturated carboxylic acid to a polymer through an addition reaction, a grafting reaction, or the like.

Examples of the unsaturated carboxylic acid and the anhydride of an unsaturated carboxylic acid include ethylenic unsaturated monocarboxylic acids such as acrylic acid, methacrylic acid, ethacrylic acid, and crotonic acid; ethylenic unsaturated dicarboxylic acids, anhydrides of ethylenic unsaturated carboxylic acids, and half esters of ethylenic unsaturated carboxylic acids, such as fumaric acid, itaconic acid, citraconic acid, maleic acid, monomethyl maleate, and monoethyl maleate. These unsaturated carboxylic acids, etc., may be used alone or in combination of two or more.

Examples of the polymer include polyethylene, polypropylene, polybutene, and copolymers of ethylene and $\alpha$-olefin with 3 to 20 carbon atoms (ethylene-$\alpha$-olefin copolymers).

The acid-modified polymer used in the present disclosure is preferably a maleic anhydride-modified polymer.

The maleic anhydride-modified polymer will be described below.

Maleic Anhydride-Modified Polymer

The maleic anhydride-modified polymer is obtained by modifying at least one of the main chains and the side chain of a polymer with maleic anhydride. However, the maleic anhydride-modified polymer does not encompass maleic anhydride-modified EVAs and maleic anhydride-modified ethylene-vinyl alcohol copolymers in which the ethylene content is 70 to 90 mol %.

Examples of the polymer to be modified with maleic anhydride include polyethylene, polypropylene, polybutene, and ethylene-$\alpha$-olefin copolymers.

Specifically, ethylene-$\alpha$-olefin copolymers and polyethylene are preferable from the viewpoint of suppressing the generation of die drool, and ethylene-$\alpha$-olefin copolymers are more preferable.

Examples of the ethylene-$\alpha$-olefin copolymers include ethylene-propylene copolymers, ethylene-1-butene copolymers, ethylene-1-hexene copolymers, ethylene-4-methyl-1-pentene copolymers, ethylene-1-octene copolymers, ethylene-1-butene-1-hexene copolymers, ethylene-1-butene-4-methyl-1-pentene copolymers, and ethylene-1-butene-1-octene copolymers. Ethylene-1-butene copolymers, ethylene-1-hexene copolymers, ethylene-1-octene copolymers, ethylene-1-butene-1-hexene copolymers, and ethylene butene-1-octene copolymers are preferable.

The maleic anhydride-modified polymer can be obtained by replacing some of the monomer molecules to be included in a polymer with maleic anhydride molecules before copolymerizing the monomers, or introducing maleic anhydride into some side chains through a grafting reaction or the like, such as a radical addition.

The acid value of the maleic anhydride-modified polymer is typically 50 mg KOH/g or less, preferably 30 mg KOH/g or less, and more preferably 20 mg KOH/g or less. If the acid value is too high, the number of reaction sites with hydroxy groups in the EVOH (B) will increase, leading to the formation of a highly polymerized product in the melt kneading process, which impairs the stability during extrusion, and, thus, there is a trend that a favorable molded product is unlikely to be obtained. The lower limit of the acid value is typically 1 mg KOH/g, and preferably 2 mg KOH/g. The above-described acid value is measured as defined in JIS K0070.

When maleic anhydride-modified polyethylene is used as the maleic anhydride-modified polymer, the MFR (at 190° C. and a load of 2,160 g) is typically 0.01 to 150 g/10 minutes, preferably 0.1 to 50 g/10 minutes, more preferably 1 to 25 g/10 minutes, and even more preferably 3 to 10 g/10 minutes.

When a maleic anhydride-modified ethylene-α-olefin copolymer is used as the maleic anhydride-modified polymer, the MFR (at 230° C. and a load of 2,160 g) is typically 0.1 to 150 g/10 minutes, preferably 0.5 to 100 g/10 minutes, more preferably 1 to 50 g/10 minutes, and even more preferably 5 to 35 g/10 minutes.

If the MFR is out of the range above, the compatibility with the base polymer tends to be impaired, and the dispersibility during mixing tends to be impaired.

The content of the maleic anhydride-modified polymer is preferably 0.1 to 20 parts by weight, more preferably 0.2 to 15 parts by weight, and even more preferably 0.5 to 10 parts by weight, with respect to a total of 100 parts by weight of the low-density bio-polyethylene resin (A) and the EVOH (B). When the content of the maleic anhydride-modified polymer is within the range above, there is a trend that pellets having an unfavorable shape are much less likely to be formed, and the generation of die drool during molding and the impairment of the external appearance of a molded product, such as a change in color, can be suppressed. These maleic anhydride-modified polymers may be used alone or in combination of two or more.

Ethylene-Vinyl Alcohol Copolymer in which Content of Ethylene Structural Unit is 70 to 90 Mol %

The "ethylene-vinyl alcohol copolymer in which the content of the ethylene structural unit is 70 to 90 mol %" (which may be referred to as a "saponified EVA" hereinafter) is obtained by saponifying the vinyl acetate component in the ethylene-vinyl acetate copolymer in which the ethylene content is 70 to 90 mol %, and is different from the EVA in that the EVA is not saponified.

The ethylene-vinyl acetate copolymer can be manufactured using any known polymerization method, such as solution polymerization, suspension polymerization, or emulsion polymerization, and saponification of the ethylene-vinyl acetate copolymer can also be performed using a known method. The saponified EVA may be modified as necessary.

The ethylene content in the saponified EVA is 70 to 90 mol %, preferably 75 to 90 mol %, and more preferably 80 to 90 mol %. If the ethylene content is too low, the effects of the present disclosure (e.g., suppression of the generation of die drool) tend to be insufficiently exhibited.

The degree of saponification of the saponified EVA is typically 20 mol % or more, preferably 60 to 100 mol %, and more preferably 90 to 100 mol %. That is to say, if the degree of saponification is too low, the effects of the present disclosure (e.g., suppression of the generation of die drool) tend to be insufficiently exhibited.

The MFR (at 190° C. and a load of 2,160 g) of the saponified EVA is typically 0.5 to 100 g/10 minutes, preferably 1 to 50 g/10 minutes, and more preferably 2 to 30 g/10 minutes, because excellent dispersibility is achieved, and thus the effects of the present disclosure are favorably exhibited.

The saponified EVA may be modified by chemically bonding an unsaturated carboxylic acid or an anhydride of an unsaturated carboxylic acid to a saponified EVA through an addition reaction, a grafting reaction, or the like to the extent that the gist of the present disclosure is not impaired. It is preferable that the modification level is, for example, 10 mol % or less. Examples of the unsaturated carboxylic acid and the anhydride of an unsaturated carboxylic acid include ethylenic unsaturated monocarboxylic acids such as acrylic acid, methacrylic acid, ethacrylic acid, and crotonic acid; ethylenic unsaturated dicarboxylic acids, anhydrides of ethylenic unsaturated dicarboxylic acids, and half esters of ethylenic unsaturated dicarboxylic acids, such as fumaric acid, itaconic acid, citraconic acid, maleic acid, monomethyl maleate, monoethyl maleate, and maleic anhydride. These unsaturated carboxylic acids, etc., may be used alone or in combination of two or more. Specifically, maleic anhydride is preferable.

The content of the saponified EVA is preferably 0.1 to 20 parts by weight, more preferably 0.2 to 15 parts by weight, and even more preferably 0.5 to 10 parts by weight, with respect to a total of 100 parts by weight of the low-density bio-polyethylene resin (A) and the EVOH (B). When the content of the saponified EVA is within the range above, there is a trend that pellets having an unfavorable shape are much less likely to be formed, and the generation of die drool during molding and the impairment of the external appearance of a molded product, such as a change in color, can be suppressed. These saponified EVAs may be used alone, or two or more of these saponified EVAs that differ in the ethylene content, degree of saponification, molecular weight, MFR, density, modifying group, level of modification by a modifying group, or the like may be used in combination.

The resin composition according to the present disclosure is obtained by adding the component (C) to the base polymer (low-density bio-polyethylene resin (A)+EVOH (B)), and, in particular, the component (C) is preferably EVA or an acid-modified polymer, and more preferably EVA.

Other Components

The resin composition according to the present disclosure may further contain a thermoplastic resin (e.g., petroleum-derived polyethylene) other than (A) to (C) above and an additive that is usually added to thermoplastic resins, as long as the effects of the present disclosure are not inhibited.

Examples of the additives include plasticizers (e.g., aliphatic polyhydric alcohols such as ethylene glycol, glycerin, hexanediol, etc.), oxygen absorbers, thermal stabilizers, light stabilizers, ultraviolet absorbers, colorants, antistatic agents, surfactants (excluding those used as lubricants), antibacterial agents, antiblocking agents, fillers (e.g., inorganic fillers etc.), and the like. These additives may be used alone or in combination of two or more.

Production of Resin Composition

The resin composition according to the present disclosure contains (A) to (C) above, and is preferably constituted by only (A) to (C) above, or only (A) to (C) above and appropriately the other components above. For the low-density bio-polyethylene resin (A) and the EVOH (B), a material (unrecycled product) that has never been used for molding may be used, or a recovered product such as a scrap of a multilayer structure that has layers respectively containing the low-density bio-polyethylene resin (A) and the EVOH (B) and is generated during the production of a final product using the multilayer structure as described later may be used.

In some cases, multilayer structures recovered after being used in various packages can also be used. In general, multilayer structures used in packages for food and the like also include an adhesive-agent resin layer and a regrind layer in addition to the layers of the low-density bio-polyethylene resin (A) and the EVOH (B). Accordingly, the resin composition according to the present disclosure may also contain the adhesive-agent resin layer and the regrind layer as long as the effects of the present disclosure are not inhibited (for example, these layers are contained in an amount of 30 wt. % or less in the resin composition).

Hereinafter, a method for producing the resin composition according to the present disclosure will be described by means of an example in which a recovered multilayer structure containing layers of the low-density bio-polyethylene resin (A) and the EVOH (B) is used.

Usually, unwanted portions (scraps) such as trimmings and edges generated during production of products using multilayer structures, and recovered multilayer structures recovered as wastes are ground and subjected to particle size adjustment with a sieve or the like as necessary, and then used as the material of the resin composition according to the present disclosure.

The grinding of the recovered material can be performed using a known grinder. The apparent density of the ground product is typically 0.25 to 0.85 g/mL, preferably 0.3 to 0.7 g/mL, and more preferably 0.35 to 0.6 g/mL. If the apparent density is too low, the dispersion of the low-density bio-polyethylene resin (A) in the resin composition layer tends to be poor, and the melt moldability and mechanical properties of the resin composition layer in a molded product to be obtained tend to be impaired. If the apparent density is too high, the melt moldability of a regrind layer in a molded product to be obtained tends to be impaired due to the occurrence of improper feeding in the extruder. Note that the above-mentioned apparent density refers to a value as measured in conformity with a testing method specified in "5.3 Apparent Density" of JIS K6891.

The apparent density can be controlled by freely adjusting the shape of a grinding blade of the grinder, the number of revolutions of the grinding blade, the processing speed of grinding, the aperture size of a mesh that is used as the sieve, and the like. The shape and particle size of the ground product can be adjusted using a known method.

In the case where the ground product obtained from the recovered multilayer structure containing the low-density bio-polyethylene resin (A) and the EVOH (B) (hereinafter referred to simply as the "ground product") is used, the resin composition according to the present disclosure is produced by adding the component (C) to the ground product. In terms of productivity, an unrecycled low-density bio-polyethylene resin (A) or an unrecycled EVOH (B) may also be blended into the ground product.

Examples of the method for producing the resin composition include known methods such as dry blending, melt kneading, solution mixing, and impregnation.

An example of the dry blending is (i) a method in which the ground product and the component (C) are dry blended using a tumbler or the like. During the dry blending, the component (C) may be dry blended as it is, or the ground product and pellets of a thermoplastic resin containing the component (C) that have been prepared beforehand may be dry blended.

Examples of the melt kneading include (ii) a method in which a dry blended product obtained in (i) above is melt kneaded and (iii) a method in which the component (C) is added to the ground product in a molten state and the mixture is melt kneaded.

An example of the solution mixing is (iv) a method in which the component (C) is blended to a solution that has been prepared using the ground product, the mixture is solidified and molded, and then solid-liquid separation is performed, followed by drying.

In the present disclosure, the above-mentioned different methods can be used in combination. Specifically, melt kneading is preferable, and the method (ii) is particularly preferable, in terms of productivity.

The material of the resin composition according to the present disclosure is not limited to the recovered multilayer structure to be used as described above, and an unrecycled low-density bio-polyethylene resin (A) and an unrecycled EVOH (B) may be used. When the unrecycled products are used, the resin composition can be prepared so as to have the blending composition according to the present disclosure using a known, commonly used method, such as dry blending, melt kneading, or solution mixing, and the present disclosure also encompasses the thus prepared resin composition.

The YI (yellow index) (ASTM D1925) of the resin composition according to the present disclosure is typically 20 or less, preferably 15 or less, and more preferably 10 or less. The YI of the resin composition is obtained through measurement performed using a spectral colorimeter (CM-3500d, manufactured by Konica Minolta, Inc.) under the following measurement conditions.

Measurement Conditions
  Light source: D65
  CM-A120 white calibration plate
  CM-A126 petri dish set used
  Specular reflection measurement SCE
  Measurement diameter: ø30 mm The biomass rate of the resin composition according to the present disclosure is typically 10 to 90 wt. %, preferably 15 to 70 wt. %, and more preferably 20 to 50 wt. %. The biomass rate of the resin composition is calculated according to the following formula:

$$\text{Biomass rate (wt. \%)} = M1/M2 \times 100$$

In the formula above, M1 is the total weight of the low-density bio-polyethylene resin (A) used, and M2 is the total weight of the resins used.

The MFR (at 210° C. and a load of 2,160 g) of the resin composition according to the present disclosure is typically 0.1 to 50 g/10 minutes, preferably 0.5 to 30 g/10 minutes, and more preferably 2 to 10 g/10 minutes.

The water content in the resin composition according to the present disclosure is typically 0.01 to 0.5 wt. %, preferably 0.02 to 0.35 wt. %, and more preferably 0.05 to 0.3 wt. %.

In the present disclosure, the water content in the resin composition is measured and calculated using the following method.

The weight (W1) of the resin composition before drying is weighed using an electronic scale, and the weight (W2) is weighed after the resin composition is dried in a hot-air dryer at 150° C. for 5 hours and is then allowed to cool in a desiccator for 30 minutes. The water content is calculated according to the following formula.

$$\text{Water content (wt. \%)} = [(W1-W2)/W1] \times 100$$

The resin composition according to the present disclosure is prepared into various forms such as a pellet form and a powder form and is provided as a molding material for various types of molded products. In particular, it is preferable to provide the resin composition according to the present disclosure as a material for melt molding because the effects of the present disclosure tend to be efficiently obtained.

Practical examples of the molded product include a single-layer film that is molded using the resin composition according to the present disclosure, and a multilayer structure having a layer that is molded using the resin composition according to the present disclosure.

Multilayer Structure

The multilayer structure includes a layer made of the resin composition according to the present disclosure. Stacking a layer made of the resin composition according to the present disclosure (referred to as a "resin composition layer" hereinafter) on another base material (referred to as a "base material resin" hereinafter) composed mainly of a thermoplastic resin other than the resin composition according to the present disclosure can impart further strength or impart other functions to the resulting multilayer structure.

Examples of the base material resin include polyethylene resins such as linear low-density polyethylene, low-density polyethylene, ultra-low-density polyethylene, medium-density polyethylene, high-density polyethylene, ethylene-propylene (block and random) copolymers, and ethylene-α-olefin (α-olefin with 4 to 20 carbon atoms) copolymers; polypropylene resins such as polypropylene and propylene-α-olefin (α-olefin with 4 to 20 carbon atoms) copolymers; polyolefin resins in a broad sense, including (unmodified) polyolefin resins such as polybutene, polypentene, and polycyclic olefin resins (polymers having a cyclic olefin structure in at least one of the main chains and side chains), and modified olefin resins such as unsaturated carboxylic acid-modified polyolefin resins obtained by grafting the above-described polyolefins with unsaturated carboxylic acids or esters of unsaturated carboxylic acids; ionomers; ethylene-vinyl acetate copolymers; ethylene-acrylic acid copolymers; ethylene-acrylic acid ester copolymers; polyester resins; polyamide resins (including copolymerized polyamide); polyvinyl chloride; polyvinylidene chloride; acrylic resins; polystyrene resins; vinyl ester resins; polyester elastomers; polyurethane elastomers; polystyrene elastomers; halogenated polyolefins such as chlorinated polyethylene and chlorinated polypropylene; aromatic or aliphatic polyketones; and the like.

Specifically, polyamide resins, polyolefin resins, polyester resins, and polystyrene resins are preferable in terms of economy and productivity, and polyolefin resins such as polyethylene resins, polypropylene resins, polycyclic olefin resins, and unsaturated carboxylic acid-modified polyolefin resins based on polyethylene resins, polypropylene resins, and polycyclic olefin resins are more preferable.

With regard to the layer configuration of the multilayer structure, when a resin composition layer is represented by a (a1, a2, . . . ) and the base material resin layer is represented by b (b1, b2, . . . ), any combinations, such as a/b, b/a/b, a/b/a, a1/a2/b, a/b1/b2, b2/b1/a/b1/b2, and b2/b1/a/b1/a/b1/b2, can be used. Furthermore, it is possible to add a recycled layer that is obtained by remelting and remolding edges, defective products, and the like generated in the process of producing the multilayer structure and that contains a mixture of the resin composition according to the present disclosure and a base material resin. The total number of layers constituting the multilayer structure is typically 2 to 15, and preferably 3 to 10. In the above-mentioned layer configuration, an adhesive resin layer containing an adhesive resin may be provided between the layers as necessary.

Known adhesive resins can be used as the above-mentioned adhesive resin, and an appropriate adhesive resin can be selected according to the type of the thermoplastic resin used for the base material resin layer "b." A typical example of the adhesive resins is a carboxy group-containing modified polyolefin polymer that is obtained by chemically bonding an unsaturated carboxylic acid or an anhydride of an unsaturated carboxylic acid to a polyolefin resin through an addition reaction, a grafting reaction, or the like. Examples of the carboxy group-containing modified polyolefin polymer include maleic anhydride grafted polyethylene, maleic anhydride grafted polypropylene, maleic anhydride grafted ethylene-propylene (block and random) copolymers, maleic anhydride grafted ethylene-ethyl acrylate copolymers, maleic anhydride grafted ethylene-vinyl acetate copolymers, maleic anhydride-modified polycyclic olefin resins, and maleic anhydride grafted polyolefin resins. These polymers can be used alone, or a mixture of two or more selected from these polymers can be used.

In the case where the adhesive resin layer is used between the resin composition layer and the base material resin layer in the multilayer structure, it is preferable to use a highly hydrophobic adhesive resin because the adhesive resin layer is located on both sides of the resin composition layer.

The base material resin and the adhesive resin may each contain plasticizers, fillers, clays (montmorillonite, etc.), colorants, antioxidants, antistatic agents, lubricants, nucleating agents, antiblocking agents, waxes, and the like to the extent that the gist of the present disclosure is not impaired (for example, in an amount of 30 wt. % or less, and preferably 10 wt. % or less, with respect to the entire resin).

The resin composition according to the present disclosure can be stacked on the base material resin using a known method (the same applies to a case where an adhesive resin layer is provided between the resin composition according to the present disclosure and the base material resin). Examples include a method in which the base material resin is melt-extruded and stacked onto a film, a sheet, or the like made of the resin composition according to the present disclosure; a method in which the resin composition according to the present disclosure is melt-extruded and stacked onto a base material resin layer; a method in which the resin composition and the base material resin are co-extruded; a method in which a resin composition layer and a base material resin layer are dry-stacked using a known adhesive such as an organotitanium compound, an isocyanate compound, a polyester compound, or a polyurethane compound; and a method in which a solution of the resin composition is applied onto the base material resin and then the solvent is removed. Of these methods, the method in which the resin composition and the base material resin are co-extruded is preferable in terms of cost and environment.

The multilayer structure is subjected to (heat) stretching as necessary. The stretching may be either uniaxial stretching or biaxial stretching, and, in the case of biaxial stretching, simultaneous stretching or sequential stretching may be performed. Furthermore, as the stretching method, out-of-roll stretching, tenter stretching, tubular stretching, stretch blowing, vacuum/pressure forming, and the like, a method that realizes a high stretch ratio may also be used. The stretching temperature is a temperature close to the melting point of the multilayer structure, and is selected from the range of typically about 40° C. to 170° C., and preferably about 60° C. to 160° C. If the stretching temperature is too low, the stretchability will be poor. On the other hand, if the stretching temperature is too high it will be difficult to maintain a stable stretched state.

Furthermore, after the stretching is completed, heat fixing may also be performed for the purpose of imparting dimensional stability to the stretched multilayer structure. Heat fixing can be performed using well-known means, and, for example, the stretched multilayer structure is heat-treated at typically 80° C. to 180° C., and preferably 100° C. to 165° C., typically for about 2 to 600 seconds, while keeping the multilayer structure under tension. On the other hand, when a stretched film having a multilayer structure that is obtained using the resin composition according to the present disclosure is to be used as a shrink film, in order to impart heat shrinkability to the film, instead of heat fixing, treatment such as cold fixing can be performed by, for example, exposing the stretched film to cold air.

In some cases, a multilayer container in the form of a cup or a tray can also be obtained using the multilayer structure of the present disclosure. In such a case, draw forming is typically used, and specific examples of draw forming include vacuum forming, pressure forming, vacuum/pressure forming, and plug-assisted vacuum/pressure forming. Furthermore, when a multilayer container (stack structure) in the form of a tube or a bottle is to be obtained from a multilayer parison (hollow tubular pre-molded product before blowing), blow molding is used. Specific examples of blow molding include extrusion blow molding (twin head type, mold transfer type, parison shift type, rotary type, accumulator type, horizontal parison type, etc.), cold parison type blow molding, injection blow molding, and biaxial stretch blow molding (extrusion cold parison biaxial stretch blow molding, injection cold parison biaxial stretch blow molding, injection molding in-line biaxial stretch blow molding, etc.). The resulting stack can be heated, cooled, rolled, printed, dry-stacked, solution- or melt-coated, bagged, deep-drawn, boxed, tubed, split, or otherwise processed as necessary.

The thickness of the multilayer structure (including the stretched multilayer structure) as well as the thicknesses of the resin composition layer, the base material resin layer, and the adhesive resin layer constituting the multilayer structure depend on the layer configuration, the type of base material resin, the type of adhesive resin, the use and packaging form, required physical properties and the like, and cannot be unconditionally defined, but the thickness of the multilayer structure (including the stretched multilayer structure) is typically 10 to 5,000 µm, preferably 30 to 3,000 µm, and more preferably 50 to 2,000 µm. The thickness of the resin composition layer is typically 1 to 500 µm, preferably 3 to 300 µm, and more preferably 5 to 200 µm; the thickness of the base material resin layer is typically 5 to 3,000 µm, preferably 10 to 2,000 µm, and more preferably 20 to 1,000 µm; and the thickness of the adhesive resin layer is typically 0.5 to 250 µm, preferably 1 to 150 µm, and more preferably 3 to 100 µm.

Furthermore, the thickness ratio of the resin composition layer to the base material resin layer (resin composition layer/base material resin layer) in the multilayer structure (when a plurality of resin composition layers and a plurality of base material resin layers are present, the ratio between the thickest layers is employed) is typically 1/99 to 50/50, preferably 5/95 to 45/55, and more preferably 10/90 to 40/60. On the other hand, the thickness ratio of the resin composition layer to the adhesive resin layer (resin composition layer/adhesive resin layer) in the multilayer structure (when a plurality of resin composition layers and a plurality of adhesive resin layers are present, the ratio between the thickest layers is employed) is typically 10/90 to 99/1, preferably 20/80 to 95/5, and more preferably 50/50 to 90/10.

Containers, such as bags, cups, trays, tubes, and bottles, made of films, sheets, or stretched films obtained as described above, are useful as various types of packaging-member containers for common food products and seasonings such as mayonnaise and dressings, fermented foods such as miso, oil and fat foods such as salad oil, as well as beverages, cosmetics, pharmaceuticals, and the like.

EXAMPLES

Hereinafter, the present disclosure will be described in further detail using examples, but the present disclosure is not limited to the examples below and includes other matter that does not depart from the gist of the present disclosure. Note that "parts" and "%" in the following description mean "parts by weight" and "wt. %," respectively, unless otherwise specified.

Prior to the examples, the following components were prepared.

Low-Density Bio-Polyethylene Resin (A)
- (A-1): Low-density bio-polyethylene [SEB853 (Green PE, manufactured by Braskem), MFR: 2.7 g/10 minutes (at 190° C. and a load of 2,160 g), minimum biomass rate: 95% (derived from plants)]
- (A'-1): Linear low-density bio-polyethylene [SLH118 (Green PE, manufactured by Braskem), MFR: 1.0 g/10 minutes (at 190° C. and a load of 2,160 g), minimum biomass rate: 84% (derived from plants)]
- (A'-2): High-density bio-polyethylene [SGM9450F (Green PE, manufactured by Braskem), MFR: 0.33 g/10 minutes (at 190° C. and a load of 5,000 g), minimum biomass rate: 96% (derived from plants)]
- (A'-3): Petroleum-derived polyethylene [NOVATEC LF448K1 (manufactured by Japan Polyethylene Corporation), MFR: 2.0 g/10 minutes (at 190° C. and a load of 2,160 g)]

EVOH (B)
- (B-1): Ethylene-vinyl alcohol copolymer [ethylene content: 29 mol %, MFR: 4 g/10 minutes (at 210° C. and a load of 2,160 g)]
- (B-2): Ethylene-vinyl alcohol copolymer [ethylene content: 32 mol %, MFR: 3 g/10 minutes (at 210° C. and a load of 2,160 g)]
- (B-3): Ethylene-vinyl alcohol copolymer [ethylene content: 38 mol %, MFR: 3 g/10 minutes (at 210° C. and a load of 2,160 g)]
- (B-4): Ethylene-vinyl alcohol copolymer [ethylene content: 44 mol %, MFR: 3 g/10 minutes (at 210° C. and a load of 2,160 g)]

Component (C)

EVA
- (C-1): EVA [Ultrathene 3B53A (manufactured by Tosoh Corporation), vinyl acetate content: 25 mol %, MFR: 5.3 g/10 minutes (at 190° C. and a load of 2,160 g)]

Acid-Modified Polymer
- (C-2): Maleic anhydride-modified ethylene-α-olefin copolymer [Acid-modified TAFMER MA8510 (manufactured by Mitsui Chemical Inc.), MFR: 5.0 g/10 minutes (at 230° C. and a load of 2,160 g)]

Saponified EVA
- (C-3): Saponified EVA [Melthene H0051K (manufactured by Tosoh Corporation), vinyl acetate content: 11 mol %, MFR: 6.5 g/10 minutes (at 190° C. and a load of 2,160 g)]

After the components were collectively mixed so as to satisfy corresponding compositions shown in Tables 1 and 2 below through dry blending, and then the resulting mixtures were individually fed into a twin-screw kneader at a rate of 25 kg/hour using a weight feeder, obtained strands were cut using a drum pelletizer to prepare pellet-like resin compositions of Examples 1 to 15, Comparative Examples 1 to 7, and Reference Examples 1 and 2. Note that the kneading conditions were as follows.

Kneading Conditions

Twin-screw extruder: diameter of 32 mm, L/D=56 (manufactured by Japan Steel Works, Ltd.)

Setting temperatures of extruder: C2/C3/C4/C5/C6/C7/C8/C9/C10/C11/C12/C13/C14/C15/C16/D=100/170/210/220/220/220/220/220/220/220/220/220/220/220/220/220/220° C.

Screw rotation rate: 270 rpm

Discharge amount: 25 kg/hour

Cooling of strand: water cooling distance of 40 cm

Drawing rate: 25 m/min

Die: four-hole type

The resin compositions of Examples 1 to 15, Comparative Examples 1 to 7, and Reference Examples 1 and 2 prepared as described above were evaluated for the pellet shape, the amount of generated die drool, the coloration, the biomass rate, and the MFR under the following conditions. The results will be shown in Tables 1 and 2 later.

Pellet Shape

The shapes of the obtained pellets were observed under a microscope (optical microscope) and evaluated according to the following criteria.

Evaluation Criteria

A (excellent): The pellet shape was very good.

B (very good): The pellet size was uniform, but some pellets had a rough surface (shark skin-like surface) or were poorly cut.

C (poor): Many pellets were chipped or cracked, or had a rough surface (shark skin-like surface) or were poorly cut.

Amount of Generated Die Drool

Each of the resin compositions was fed into a twin-screw kneader at a rate of 25 kg/hour using a weight feeder. When 5 kg of the resin composition was discharged, generated die drool was sampled and the weight of the die drool was measured. The amount of generated die drool was evaluated according to the following criteria.

Evaluation Criteria

A (very good): The total weight of generated die drool was 0.1 g or less.

B (poor): The total weight of generated die drool was more than 0.1 g.

Evaluation of Coloration (YI)

The YI (ASTM D1925) of the obtained pellets was measured using a spectral colorimeter "CM-3500d" manufactured by Konica Minolta, Inc. (Light source: D65, CM-A120 white calibration plate, CM-A126 Petri Dish Set used, specular reflection measurement SCE, Measurement diameter: 030 mm). About 5 g of the sample was filled into the petri dish and was uniformly spread. The measurement was performed in this state, and the YI was calculated. The greater this YI value was, the yellower the resin composition was.

Biomass Rate

The biomass rates of the resin compositions were calculated according to the following formula.

Biomass rate (wt. %)=$M3/M4$×100

In the formula above, M3 is the total weight of the bio-polyethylene resin used, and M4 is the total weight of the resins used.

MFR

The MFRs (g/10 minutes) of the obtained pellets were measured at 210° C. and a load of 2,160 g.

TABLE 1

| | Resin composition | | | Evaluation | | | | |
|---|---|---|---|---|---|---|---|---|
| | Low-density bio-polyethylene resin (A) (parts by weight) | EVOH (B) (parts by weight) | Component (C) (parts by weight)* | Pellet shape | Die drool Amount (g) | Die drool Evaluation | Coloration evaluation (YI) | Biomass rate (wt. %) | MFR (g/10 min) |
| Ex. 1 | 25 (A-1) | 75 (B-1) | 5 (C-1) | A | 0.017 | A | 8 | 22 | 3.8 |
| Ex. 2 | 35 (A-1) | 65 (B-1) | 0.1 (C-1) | B | 0.038 | A | 7 | 33 | 5.4 |
| Ex. 3 | 35 (A-1) | 65 (B-1) | 1 (C-1) | A | 0.014 | A | 8 | 31 | 4.2 |
| Ex. 4 | 35 (A-1) | 65 (B-1) | 10 (C-1) | A | 0.030 | A | 5 | 31 | 4.1 |
| Ex. 5 | 35 (A-1) | 65 (B-1) | 5 (C-1) | A | 0.011 | A | 5 | 31 | 3.9 |
| Ex. 6 | 35 (A-1) | 65 (B-2) | 5 (C-1) | B | 0.015 | A | 7 | 31 | 4.3 |
| Ex. 7 | 35 (A-1) | 65 (B-3) | 5 (C-1) | B | 0.007 | A | 1 | 31 | 4.1 |
| Ex. 8 | 35 (A-1) | 65 (B-4) | 5 (C-1) | B | 0.000 | A | 0 | 31 | 3.8 |
| Ex. 9 | 35 (A-1) | 65 (B-3) | 5 (C-2) | B | 0.000 | A | 1 | 31 | 0.8 |
| Ex. 10 | 45 (A-1) | 55 (B-1) | 5 (C-1) | B | 0.008 | A | 3 | 40 | 4.3 |
| Ex. 11 | 35 (A-1) | 65 (B-4) | 1 (C-3) | A | 0.005 | A | 5 | 31 | 3.9 |
| Ex. 12 | 35 (A-1) | 65 (B-4) | 5 (C-3) | A | 0.002 | A | 4 | 31 | 4.2 |
| Ex. 13 | 35 (A-1) | 65 (B-4) | 10 (C-3) | A | 0.000 | A | 5 | 31 | 4.4 |
| Ex. 14 | 35 (A-1) | 65 (B-4) | 15 (C-3) | A | 0.000 | A | 5 | 31 | 4.7 |
| Ex. 15 | 30 (A-1) | 70 (B-4) | 5 (C-3) | A | 0.002 | A | 3 | 27 | 4.1 |

*parts by weight with respect to a total of 100 parts by weight of the polyethylene resin (A) and the EVOH (B)

TABLE 2

| | Resin composition | | | Evaluation | | | | | |
|---|---|---|---|---|---|---|---|---|---|
| | Low-density bio-polyethylene resin (A) | EVOH (B) | Component (C) | Pellet shape | Die drool | | Coloration evaluation (YI) | Biomass rate (wt. %) | MFR (g/10 min) |
| | (parts by weight) | (parts by weight) | (parts by weight)* | | Amount (g) | Evaluation | | | |
| Comp. Ex. 1 | 35 (A-1) | 65 (B-1) | None | C | 0.004 | A | 7 | 33 | 5.4 |
| Comp. Ex. 2 | 50 (A-1) | 50 (B-1) | 5 (C-1) | C | 0.000 | A | 3 | 45 | 4.4 |
| Comp. Ex. 3 | 5 (A-1) | 95 (B-1) | 5 (C-1) | A | 0.000 | A | 18 | 4 | 3.1 |
| Comp. Ex. 4 | 35 (A'-1) | 65 (B-1) | 5 (C-1) | A | 0.375 | B | 9 | 28 | 3.1 |
| Comp. Ex. 5 | 35 (A'-2) | 65 (B-1) | 5 (C-1) | B | 0.796 | B | 12 | 32 | 1.3 |
| Comp. Ex. 6 | 50 (A-1) | 50 (B-1) | 5 (C-3) | A | 0.000 | A | 16 | 45 | 4.2 |
| Comp. Ex. 7 | 5 (A-1) | 95 (B-1) | 5 (C-3) | A | 0.002 | A | 30 | 4.5 | 3.0 |
| Ref. Ex. 1 | 35 (A'-3) | 65 (B-1) | None | B | 0.008 | A | 16 | 0 | 5.8 |
| Ref. Ex. 2 | 35 (A'-3) | 65 (B-1) | 5 (C-1) | A | 0.007 | A | 14 | 0 | 4.3 |

*parts by weight with respect to a total of 100 parts by weight of the polyethylene resin (A) and the EVOH (B)

In the case of the resin compositions of the examples containing the low-density bio-polyethylene resin (A) and the EVOH (B) at a specific ratio as well as the component (C), it was possible to make it less likely that pellets having an unfavorable shape were formed, and to suppress the generation of die drool during molding and the impairment of the external appearance of a molded product, such as a change in color.

On the other hand, in the cases of the resin composition of Comparative Example 1 containing no component (C) and the resin compositions of Comparative Examples 2 and 6 in which the content of the low-density bio-polyethylene resin (A) was higher than the range defined in the present disclosure, the pellets had an unfavorable shape, or the YI was so high that the external appearance was poor.

In the cases of the resin compositions of Comparative Examples 3 and 7 in which the content of the low-density bio-polyethylene resin (A) was lower than the range defined in the present disclosure, and the resin compositions of Reference Examples 1 and 2 in which petroleum-derived polyethylene was used, the YI was so high that the external appearance was poor.

Furthermore, in the cases where the resin composition of Comparative Example 4 in which a linear low-density polyethylene was used, and the resin composition of Comparative Example 5 in which a high-density bio-polyethylene was used, a large amount of die drool was generated.

While specific modes of the present disclosure are described in the examples above, the examples above are for illustrative purposes only and should not be construed as restrictive. Various alterations that are apparent to those skilled in the art are all intended to be within the scope of the present disclosure.

The resin composition according to the present disclosure can make it less likely that pellets having an unfavorable shape are formed, and can suppress the generation of die drool during molding and the impairment of the external appearance, such as a change in color, even when bio-polyethylene is contained in the resin composition. Accordingly, films, sheets, and stretched films made of the resin composition according to the present disclosure are useful as materials for various packaging containers.

The invention claimed is:

1. A resin composition comprising:
   a low-density bio-polyethylene resin (A);
   an ethylene-vinyl alcohol copolymer (B) in which an ethylene content is 20 to 60 mol %; and
   at least one component (C) selected from the group consisting of an ethylene-vinyl acetate copolymer, an acid-modified polymer, and an ethylene-vinyl alcohol copolymer in which an ethylene content is 70 to 90 mol %,
   wherein the low-density bio-polyethylene resin (A) is a low-density bio-polyethylene resin other than a linear low-density bio-polyethylene resin, and
   a weight ratio [(A)/(B)] of the component (A) to the component (B) is 10/90 to 49/51.

2. The resin composition according to claim 1, wherein a content of the component (C) is 0.1 to 20 parts by weight with respect to a total of 100 parts by weight of the component (A) and the component (B).

* * * * *